United States Patent [19]
Nakamura

[11] Patent Number: 5,622,610
[45] Date of Patent: Apr. 22, 1997

[54] WATER PROCESSING METHOD AND APPARATUS

[76] Inventor: Tadamasa Nakamura, 5-2-401, 3-Chome, Toyogaoka, Tama-shi, Tokyo, Japan

[21] Appl. No.: 645,581

[22] Filed: May 14, 1996

Related U.S. Application Data

[62] Division of Ser. No. 531,922, Sep. 21, 1995.

[30] Foreign Application Priority Data

Oct. 14, 1994 [JP] Japan .................................. 6-275884

[51] Int. Cl.$^6$ ........................................................ C02F 1/461
[52] U.S. Cl. ........................ 204/252; 204/263; 204/275
[58] Field of Search ............................ 204/252, 263, 204/275

[56] References Cited

U.S. PATENT DOCUMENTS 4,317,841  3/1982  Brambilla .
4,512,968  4/1985  Komiyama et al. .
5,306,409  4/1994  Arai ........................................ 204/228

Primary Examiner—Arun S. Phasge
Attorney, Agent, or Firm—Greenblum & Bernstein P.L.C.

[57] ABSTRACT

The present invention relates to a method and an apparatus for processing water, whereby water is electrolyzed to produce electrolyzed water, and aqueous solution with chitin chitosan dissolved in it is added to the electrolyzed water to eliminate chlorine components without changing the property of the electrolyzed water. To cathodic water, of the electrolyzed water, the aqueous solution with chitin chitosan dissolved in it is added by 0.001 to 0.1 weight %, and aqueous solution with chitin chitosan dissolved in it is added to the anodic water by 0.005 to 0.05 weight %.

21 Claims, 4 Drawing Sheets

FIG. 2

Results of water quality test of cathodic water, to which chitin chitosan has been added

| Test item | Non-added cathodic water | Adding quantity of chitin chitosan (weight %) | | | | | | |
|---|---|---|---|---|---|---|---|---|
| | | 0.15 | 0.1 | 0.01 | 0.001 | 0.001 | 0.0005 | 0.0002 |
| $Cl_2$ ppm | 0.3 | 0.1 or less | 0.1 or less | 0.1 or less | 0.1 or less | 0.1 or less | *0.13 | *0.15 |
| pH | 10.89 | *5.02(-5.87) | 10.85(-0.04) | 10.88(-0.01) | 10.86(-0.03) | 10.89(0) | 10.89(0) |
| ORP mv | -790 | *168(+958) | -757(+33) | -763(+27) | -770(+20) | -789(+1) | -788(+2) |
| DO ppm | 4.90 | 5.42(+0.52) | 5.36(+0.46) | 5.73(+0.83) | 4.93(+0.03) | 4.60(-0.3) | 5.05(+0.15) |
| EC μS | 363 | 430(+67) | 352(-11) | 352(-11) | 366(+3) | 365(+2) | 365(+2) |

FIG. 3

Results of water quality test of anodic water, to which chitin chitosan has been added

| Test item | Non-added anodic water | Adding quantity of chitin chitosan (weight %) | | | | |
|---|---|---|---|---|---|---|
| | | 0.1 | 0.05 | 0.01 | 0.005 | 0.001 |
| $Cl_2$ ppm | 2.5 | 0.1 or less | 0.1 or less | 0.1 or less | # 0.4 | * 2.0 |
| pH | 3.31 | * 5.03(+1.72) | 3.60(+0.29) | 3.26(-0.05) | 3.51(+0.2) | 3.28(-0.03) |
| ORP mv | 964 | * 565(-399) | 674(-290) | 909(-55) | 888(-76) | 989(+25) |
| DO ppm | 14.40 | * 11.74(-2.66) | 14.25(-0.15) | 14.29(-0.11) | 13.70(-0.7) | 14.28(-0.12) |
| EC μs | 421 | 140(-281) | 362(-60) | 421(0) | 424(+3) | 425(+4) |

WATER PROCESSING METHOD AND APPARATUS

This application is a division of application Ser. No. 08/531,922, filed Sep. 21, 1995, pending.

BACKGROUND OF THE INVENTION

The present invention relates to a method and an apparatus for processing water, and in particular to a method for processing water by adding chitin chitosan to electrolyzed water, which is obtained by electrolyzing water, and to an apparatus for such processing.

Chitin chitosan as used in this specification is defined as chitin or chitosan in isolated status or chitin and chitosan in mixed status, and water is defined as potable water, e.g. city water or well water.

Chitin is produced from limbs and shells of crabs, lobsters, shrimps, etc., and when it is used in drinks, it gives favorable influence to human body, for example, it suppresses aging, reinforces immunopotence, prevents or recovers various diseases, regulates autonomic nerves or maintains blood concentration at a constant level, or regulates hormone secretion. Or, when it is applied on skin, it is known that it provides astringent effect or rinse effect. Chitosan is a deacetylated product of chitin and has more powerful property than that of chitin, while, in the effects of the present invention, both substances have almost the same quality and the same property.

According to the manufacturing method of chitin chitosan as generally known, limbs and shells of crabs, lobsters, shrimps, etc. are dried and pulverized to granules. After removing protein, the granules are decalcified with hydrochloric acid or nitric acid, and the granular chitin is deacetylated by processing with caustic soda to prepare chitin chitosan, which contains chitosan by 50 to 90 weight % and chitin by 10 to 50 weight % in mixed state. It is difficult to deacetylate all of the chitin by the above processing with caustic soda, and chitin remains without being processed in the extent as described above.

The electrolyzed water is divided into cathodic water generated on cathode side and anodic water generated on anode side. The cathodic water is the so-called alkali ions water, and it tastes good when it is used for drinking or for cooking, while it is known that it gives favorable effects on human body, for example, it improves abnormal gastrointestinal fermentation, chronic diarrhea or hyperacidity and maintains stomach and intestines in good conditions, prevents cold and improves allergic constitution or various chronic diseases. On the other hand, anodic water has astringent effect (effect to contract skin) and rinse effect (effect to moisten skin) and effect to alleviate skin diseases when it is externally applied.

An electrolyzed water generator, i.e. a water processing apparatus for generating electrolyzed water, is divided into pool type and flowing type. In the pool type generator, water is pooled in an electrolytic cell and is electrolyzed for a given duration, and the electrolyzed water is then replaced with water, and the same procedure is repeated. This type of generator is disadvantageous in that much labor is required for replacement procedure. On the other hand, in the flowing type generator, water is passed through an electrolytic cell under city water pressure or pumping pressure and it is advantageous in that generated water can be obtained continuously, and it is used for general application.

In the flowing type electrolyzed water generator, free chlorine components contained in the water before electrolysis often remain on the cathode without being migrated toward the anode, and chlorine is mixed in the cathodic water used for drinking. In practical application, in order to produce and deliver more quantity of cathodic water than anodic water because it is consumed more than the anodic water, it is tried to give flow rate difference between cathode side and anode side separated via a diaphragm. For example, the electrolytic cell on the anode side is designed larger than that of the cathode side, or an orifice is provided on entrance and exit on anode side of the electrolytic cell to control the flow rate. As a result, pressure difference is generated between anode and cathode of the electrolytic cell, and chlorine condensed and separated at the anode leaks toward the cathode and chlorine may be mixed in the cathodic water.

Also, if the anodic water obtained in the above contains considerable amount of chlorine components, and if it is externally used without further processing, it may give detrimental effect on hypersensitive skin.

To prevent such negative effects, a dechlorination filter is arranged in a conventional type electrolyzed water generator as a pro-processing apparatus for the flowing type elecorolyzed water generator with the purpose of removing chlorine components contained in the water before it is electrolyzed. This dechlorination filter comprises granular or fibrous activated carbon for dechlorination effect as principal material. Further, calcium sulfite to reinforce dechlorination potency is added, or hollow yarn membranes are interwoven with the purpose of eliminating bacteria. Chlorine ions are adsorbed on activated carbon while free chlorine is not absorbed easily, and the above calcium sulfite converts the free chlorine to the chlorine ions, i.e. it has the property to increase dechlorination ability of the activated carbon.

However, in the dechlorination filter, adsorbing ability of activated carbon is often decreased by calcium sulfite, which is easily decomposed in water, iron rust, or bacterial products called slime, or hollow yarn membranes are clogged, thereby changing water flow rate. As a result, the balance between electric power for electrolysis and processed water quantity is changed, leading to the change in the quality of the generated water or to inability to provide the dechlorination. Because such change of water quality is not discernible from external appearance and can be identified only by reagent, there is the possibility that generated water having different quality from the originally intended quality may be used. In addition, the dechlorination filter is very expensive, and the replacement causes much burden on the users because the replacement procedure is complicated and difficult.

An idea has been proposed to arrange the filter only for the cathodic water of drinking purpose. In this case, however, water hardness components such as calcium, magnesium, etc. are condensed and contained in the cathodic water, and these components extremely reduces service life of the filter, on which the components are deposited and attached. Also, due to the change of hardness components in the cathodic water and filter clogging, flow rate balance between anodic water and cathodic water will be lost and water quality itself may be changed.

SUMMARY OF THE INVENTION

To solve the above problems, it is an object of the present invention to provide a method and an apparatus for processing water, by which it is possible to remove chlorine components without changing the property of the electrolyzed water, which gives favorable effects on human body.

To attain the above object, experiments have been performed, and the method for processing water according to the present invention comprises the steps of electrolyzing water to produce electrolyzed water, and of adding aqueous solution containing chitin chitosan dissolved in it to cathodic water of the electrolyzed water thus obtained so that chitin chitosan is contained in the water by 0.001 to 0.1 weight %.

If chitin chitosan is added to cathodic water by less than 0.001 weight %, full effect of chitin chitosan cannot be obtained. If it is added by more than 0.1 weight %, the water has considerable turbidity and gives astringent taste when drinking. Moreover, the above effects of the cathodic water to give favorable effects to human body are changed. Thus, it is preferable to add it within the range of 0.001 to 0.1 weight %.

According to the method for processing water of the present invention, water is electrolyzed to produce electrolyzed water, and aqueous solution containing chitin chitosan dissolved in it is added to anodic water of the electrolyzed water so that chitin chitosan is contained by 0.005 to 0.05 weight %.

If chitin chitosan is added to anodic water by less than 0.005 weight %, the above effects of chitin chitosan are not provided to full extent. If it is added by more than 0.05 weight %, the above property of the anodic water to give favorable effects when it is applied on skin is changed. Thus, it is preferable to add it within the range of 0.005 to 0.05 weight %.

Further, the apparatus for processing water according to the present invention comprises an electrolytic cell connected with a water supply pipe for supplying water to be processed and having a cathode and an anode separated from each other by a diaphragm, each of said separated portions being connected with delivery pipes for sending cathodic water or anodic water, a storage tank for storing aqueous solution of chitin chitosan and connected to each of the delivery pipes via a changeover valve, a pump for sending the aqueous solution of chitin chitosan from the storage tank, flow rate sensors mounted respectively at the middle of each of the delivery pipes and at the middle of the anodic water delivery pipe, and a control unit electrically connected with each of said flow rate sensors, said pump, and said changeover valve and for controlling the quantity of chitin chitosan aqueous solution to be sent to each of the delivery pipes via said changeover valve according to the flow rate detected by each of the flow rate sensors.

BRIEF DESCRIPTION OF THE DRAWINGS

FIG. 2 represents a table showing the results of water quality test of cathodic water processed by the above processing apparatus;

FIG. 3 is a table showing the results of water quality test of anodic water.

DESCRIPTION OF THE PREFERRED EMBODIMENTS

Figure 1:
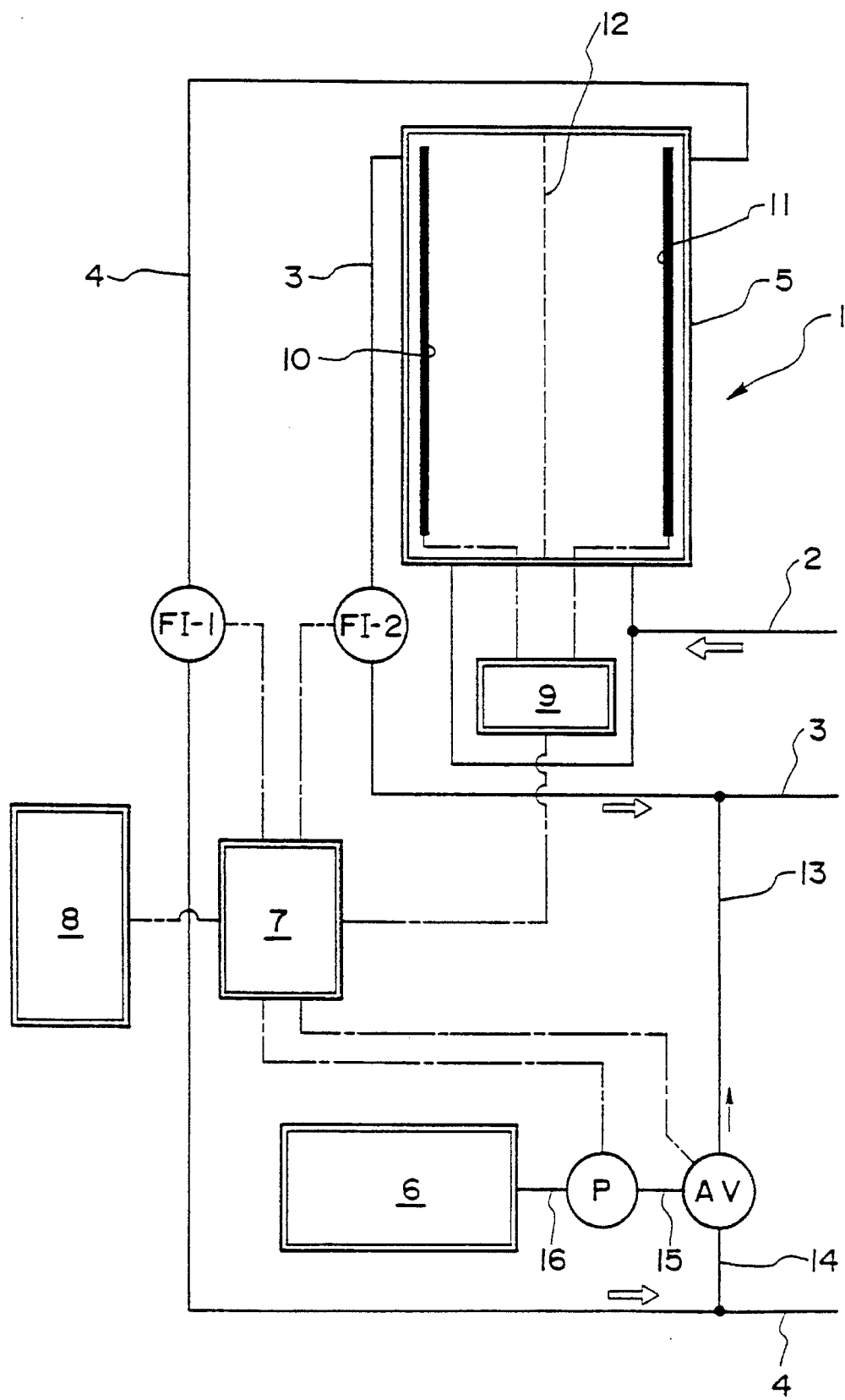
FIG. 1 is a schematical drawing of a first embodiment of an apparatus for processing water of the present invention.

First, description will be given on an apparatus for processing 1. As shown in FIG. 1, an electrolytic cell 5 of the processing apparatus 1 is divided into two sectors by a diaphragm 12 at the center, and a cathode 10 and an anode 11 electrically connected with a power source 9 are arranged respectively in these two sectors. A water supply pipe 2 for supplying city water, which is to be processed, is branched to two branch pipes to be connected with the bottom of the electrolytic cell 5. One branched pipe is connected to the cathode side and the other branched pipe is connected to the anode side. To the upper portion of the electrolytic cell 5, delivery pipes 3 and 4 for delivering cathodic water and anodic water are connected to cathode side and anode side respectively. Therefore, the city water supplied to the electrolytic cell 5 via the water supply pipe 2 is continuously electrolyzed and is sent out through the delivery pipes 3 and 4.

To each of the delivery pipes 3 and 4, a storage tank 6 for storing chitin chitosan aqueous solution with chitin chitosan dissolved in it is connected via a three-way valve AV, serving as a changeover valve, and via a pump P for sending aqueous solution, using connecting pipes 13, 14, 15 and 16, and the aqueous solution is sent to the cathodic water flowing through the delivery pipe 3 or to anodic water flowing through the delivery pipe 4 as necessary. At the middle of each of the delivery pipes 4 and 3 leading to the electrolytic cell 5, flow rate sensors FI-1 and FI-2 are mounted. The other end of each of the delivery pipes 4 and 3 opposite to the electrolytic cell 5 is connected to a tank where cathodic water or anodic water is stored respectively.

Each of the flow rate sensors FI-1 and FI-2, pump P, three-way valve AV and the power source 9 is electrically connected to a control unit 7, which is connected to an operation panel 8. By this control unit 7, the chitin chitosan aqueous solution is sent to each of the delivery pipes 3 and 4 via the three-way valve AV from the storage tank 6 by the pump P in such manner that a predetermined quantity of the chitin chitosan aqueous solution is added to the cathodic water or the anodic water according to the flow rate of the cathodic water or anodic water detected by the flow rate sensors FI-1 and FI-2. By operating the operation panel 8, the power source 9 can be turned on or off, and the quantity of the chitin chitosan aqueous solution to be added to the cathodic water OR one anodic water can be set. After setting the adding quantity of the solution, the procedure is automatically carried out.

In FIG. 1, one-dot chain line shows electrically connected status, and thick solid lines indicate the water supply pipe 2, the delivery pipes 3 and 4 and the connecting pipes for sending city water, cathodic water, anodic water and aqueous solution.

In the chitin chitosan aqueous solution, chitin chitosan is dissolved by 1 weight % in 0.7 weight % of aqueous solution of L-ascorbic acid which is an organic acid. About 1 weight % of chitin chitosan is contained in this chitin chitosan aqueous solution. Therefore, the above aqueous solution is added by 10 to 0.1 weight % to 90 to 99.9 weight % of the cathodic water delivered from the electrolytic cell 5, and 5 to 0.5 weight % of the aqueous solution is added to 95 to 99.5 weight % of the anodic water. The adding quantity is determined based on water quality of the city water, and this can be adjusted by operating the operation panel 8 as necessary. As the above organic acid, acetic acid, citric acid, tartaric acid, malic acid, etc. may be used, while it is preferable to add L-ascorbic acid because it gives less astringent taste.

Next, description will be given on a method for processing city water using the above processing apparatus 1. First, the operation panel 8 is operated to turn the power source 9 on, and adding quantity of the chitin chitosan aqueous solution to the cathodic water or the anodic water is set. The city water supplied from the water supply pipe 2 to the electrolytic cell 5 is electrolyzed by the electrodes 10 and 11, and cathodic water is delivered through the delivery pipe 3 and the anodic water through the delivery pipe 4 continuously. Flow rates of the cathodic water and the anodic water flowing through the delivery pipes 4 and 3 are detected by the flow rate sensors FI-1 and FI-2.

The results of the detection are inputted to the control unit 7, and based on the flow rates of the cathodic water and the anodic water thus inputted, the preset quantity of the chitin chitosan aqueous solution determined by the operation panel 8 in advance, e.g. 10 weight parts of the chitin chitosan aqueous solution to 90 weight parts of the cathodic water, or 5 weight parts of the chitin chitosan aqueous solution to 95 weight parts of the anodic water, is sent into the delivery pipes 3 and 4 via the three-way valve AV and the pump P from the storage tank 6. As a result, 0.1 weight % of chitin chitosan is added to the cathodic water, and 0.05 weight % of chitin chitosan is added to the anodic water, and these are sent through the delivery pipes 3 and 4 and further to another tank (not shown) and are stored there.

FIG. 2 shows the results of water quality test of the processed cathodic water collected from the delivery pipe 3, and FIG. 3 represents the results of water quality test of the processed anodic water collected from the delivery pipe 4. The purpose of the water quality tests is to evaluate the changes of quality of the city water before and after adding chitin chitosan to it. If there is not much difference in the values obtained in the test for pH, ORP, DO and EC between before and after adding chitin chitosan to cathodic water or anodic water, it is estimated that there has been no change in water quality of each water before and after the processing.

In FIG. 2 and FIG. 3, ORP is an abbreviation of "Oxidation-Reduction Potential" and is used to express oxidizing power and reducing power of a substance quantitatively. The higher its minus value is, the more easily it is oxidized and the more difficult it is reduced. In other words, the higher the minus value is, the higher the tendency to give electrons to others and to reduce the others and the more easily the substance itself is oxidized. The abbreviation DO means dissolved oxygen content. EC represents a reciprocal of electrical resistance. The higher the value in aqueous solution is, the higher the ion concentration is. In FIG. 2 and FIG. 3, the numerical value in parenthesis given in the column of "adding quantity (weight %)" represents the difference between the measured value in the column of "non-added cathodic (or anodic) water" and the measured value of the column of "adding quantity (weight %)", i.e. the degree of changed quality.

As it is evident from FIG. 2, in the processed water obtained by adding chitin chitosan by 0.1 to 0.001 weight % to the cathodic water, the quantity of chlorine ($Cl_2$) to adversely affect human body is more decreased than in the non-added cathodic water. In the water quality test items pH, ORP, DO and EC, it has less variation and the better quality than the non-added cathodic water. The added water not only has favorable taste of the cathodic water itself but also has favorable effects to human body, such as effects to prevent cold or to improve allergic constitution or to alleviate various chronic diseases. In case the adding quantity exceeds the above range of numerical values, e.g. if added by 0.15 weight %, there is unfavorable influence in pH and ORP (shown by *). On the other hand, in case the adding quantity is lower and out of the numerical range given above, e.g. if added by 0.0005 weight % or by 0.0002 weight %, the ability to eliminate chlorine ($Cl_2$) is not sufficient (shown by *).

As it is evident from FIG. 3, in the processed water obtained by adding chitin chitosan by 0.05 to 0.005 weight % to the anodic water, chlorine ($Cl_2$) to adversely affect human body is drastically decreased compared with the non-added water. In the water quality test items of pH, ORP, DO and EC, it has less variation and the better quality than the non-added water. And there is almost no influence on the property giving favorable effects, i.e. to give astringent effect or rinse effect of the anodic water itself or the effect to alleviate skin diseases. In case the adding quantity is 0.005 weight %, chlorine residual quantity is 0.4 ppm (given by #), while this is the allowable limit value in the standards for water purifier in Japan, and there is no problem because it is used for external application. If the adding quantity is out of the above numerical range, e.g. if added by 0.1 weight %, there is influence in pH, ORP and DO (given by *). In case the adding quantity is too low, e.g. if added by 0.001 weight %, the ability to eliminate chlorine ($Cl_2$) is not sufficient (shown by *).

It is empirically known that chitin chitosan gives favorable influence on human body, i.e. it suppresses aging, reinforces immunopotence, prevents various diseases, contributes to recovery from diseases, regulates autonomic nerve and maintain blood concentration at a constant level, and adjusts hormone secretion. As described above, the processed cathodic water for drinking is expected to give these effects of chitin chitosan itself at the same time. Further, in the processed anodic water used for external application such as application to skin, the anodic water gives the effects of the above cathodic water itself and the effects of chitin chitosan, such as astringent effect, rinse effect, or the effect to increase viscosity by adding of chitin chitosan, and it is maintained well on skin surface when applied on skin.

Figure 4:
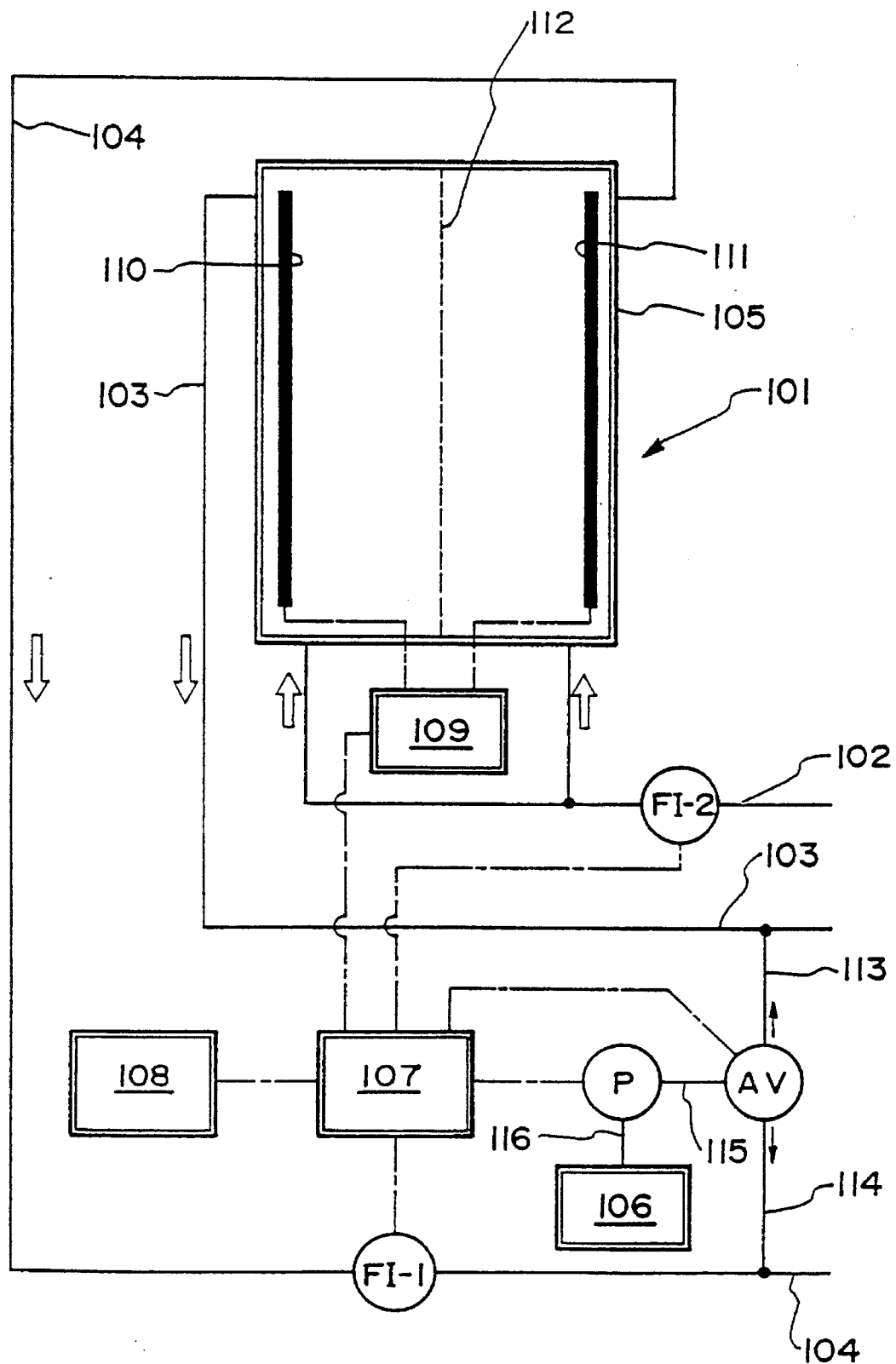
FIG. 4 is a schematical drawing of a second embodiment of the processing apparatus.

Next, description will be given on a second embodiment of a processing apparatus referring to FIG. 4. This embodiment is different from the above first embodiment only in that the flow rate sensor FI-2 is mounted not on the delivery pipe 103 but on the water supply pipe 102.

To a processing apparatus 101, a water supply pipe 102 is connected, and a cathode 110 and an anode 111 are separated from each other by a diaphragm 112. In an electrolytic cell 105, a delivery pipe 103 or a delivery pipe 104 for delivering cathodic water or anodic water is connected to each of the separated portions. To the delivery pipes 103 and 104, a storage tank 106 where the chitin chitosan aqueous solution is stored is connected via connecting pipes 113, 114, 115 and 116. To send the chitin chitosan aqueous solution out of the storage tank 106, a three-way valve AV, serving as a changeover valve, and a pump P are provided on the connecting pipes 113, 114, 115 and 116. At the middle of each of the delivery pipe 104 and the water supply pipe 102 leading to the electrolytic cell 105, flow rate sensors FI-1 and FI-2 are mounted.

A control unit 107 is arranged in such manner that it is electrically connected to each of the flow rate sensors FI-1 and FI-2, the pump P and the three-way valve AV, and a given quantity of chitin chitosan aqueous solution is sent to the delivery pipes 103 and 104, based on the detected flow rate of the electrolyzed water, via the three-way valve AV. Further, an operation panel 108 for operating the control unit 107 and a power source 109 is provided.

In the present embodiment, flow rate of the delivery pipe 103 is obtained by subtracting the flow rate obtained at the delivery pipe 104 from the flow rate detected by the flow rate sensor FI-2 on the water supply pipe 102. In FIG. 4, one-dot chain line indicates electrically connected status as in FIG. 1, while the water supply pipe 102, the delivery pipes 103 and 104 for sending city water, cathodic water, anodic water and aqueous solution as well as the connecting pipes 113, 114, 115 and 116 are shown by thick solid lines.

The method for processing city water using the processing apparatus 101 the present embodiment is the same as that of the first embodiment, and detailed description is not given here.

It is needless to say that the present invention is not limited to any of the above embodiments. For example, in carrying out the method for processing water, the arrangement may be changed to a flowing type apparatus different from the above processing apparatuses 1 and 101, and a pool type apparatus may be used.

As it is evident from the above explanation, when chitin chitosan is added to cathodic water in the present invention, it is possible to eliminate chlorine components contained in the cathodic water without losing the favorable taste of the cathodic water itself and without changing the property to give favorable influence on human body such as the effects to maintain stomach and intestines in good conditions by improving gastrointestinal abnormal fermentation, chronic diarrhea and other chronic diseases.

In case chitin chitosan is added to the anodic water of the present invention, it is possible to eliminate chlorine components contained in the anodic water without changing the property such as the astringent effect, rinse effect of the anodic water as well as the effect to alleviate skin diseases.

By the processing apparatus of the present invention, it is possible to easily process water by adding adequate quantity of aqueous solution containing chitin chitosan dissolved in it into the electrolyzed water and to process water in easy manner.

What I claim are:

1. An apparatus for processing water, comprising an electrolytic cell connected with a water supply pipe for supplying water to be processed and having a cathode and an anode separated from each other by a diaphragm, each of said separated portions being connected with delivery pipes for sending cathodic water or anodic water, a storage tank for storing aqueous solution of chitin chitosan and connected to each of the delivery pipes via a changeover valve, a pump for sending the aqueous solution of chitin chitosan from the storage tank, flow rate sensors mounted respectively at the middle of each of the delivery pipes and at the middle of the anodic water delivery pipe, and a control unit electrically connected with each of said flow rate sensors, said pump, and said changeover valve and for controlling the quantity of chitin chitosan aqueous solution to be sent to each of the delivery pipes via said changeover valve according to the flow rate detected by each of the flow rate sensors.

2. An apparatus for processing water, comprising:

an electrolytic cell;

a diaphragm dividing said electrolytic cell into two chambers;

a cathode provided in one of said two chambers;

an anode provided in the other of said two chambers;

a power source electrically connected to said anode and said cathode for providing power to said cathode and said anode;

a water supply pipe connected to each of said two chambers for inputting water to said chambers;

a cathodic water delivery pipe connected to said chamber in which said cathode is provided;

an anodic water delivery pipe connected to said chamber in which said anode is provided;

a container containing an aqueous solution comprising chitin chitosan, said container selectively connectable with said cathodic water delivery pipe and said anodic water delivery pipe.

3. The apparatus of claim 2, further comprising:

a control unit connected to said power supply for controlling an ON/OFF condition of said power supply.

4. The apparatus of claim 2, further comprising:

a pump for pumping said aqueous solution selectively to at least one of said anodic water delivery pipe and said cathodic water delivery pipe; and a control unit connected to said pump for controlling a rate at which said pump pumps said aqueous solution.

5. The apparatus of claim 2, further comprising:

a selection device for selectively connecting said container to at least one of said anodic water delivery pipe and said cathodic water delivery pipe; and a control unit connected to said selection device for controlling said selective connection.

6. The apparatus of claim 2, further comprising:

a first flow meter provided in said cathodic water delivery pipe;

a second flow meter provided in said anodic water delivery pipe; and a control unit connected to said first and second flow meters, wherein said control unit monitors flow rates through said first and second flow meters.

7. The apparatus of claim 6, further comprising:

an operation panel connected to said control unit;

wherein said control unit is connected to said power supply and said operation panel can be operated to turn said power supply ON and OFF.

8. The apparatus of claim 7, further comprising:

a pump for pumping said aqueous solution selectively to at least one of said anodic water delivery pipe and said cathodic water delivery pipe; and a selection device for selectively connecting said container to at least one of said anodic water delivery pipe and said cathodic water delivery pipe;

wherein said control unit is connected to said pump for controlling a rate at which said pump pumps said aqueous solution, and to said selection device for controlling said selective connection; and wherein said operation panel can be operated to control the quantity of aqueous solution added to each of said anodic water delivery pipe and said cathodic water delivery pipe.

9. An apparatus for processing water, comprising:

an electrolytic cell comprising two chambers;

a water supply pipe connected to each of said two chambers for inputting water to said chambers;

a cathodic water delivery pipe connected to one of said two chambers;

an anodic water delivery pipe connected to an other of said two chambers;

means for supplying an aqueous solution comprising chitin chitosan to at least one of said cathodic water delivery pipe and said anodic water delivery pipe; and means for controlling an amount of said aqueous solution to at least one of said cathodic water delivery pipe and said anodic water delivery pipe.

10. An apparatus for processing water, comprising:

an electrolytic cell;

a diaphragm dividing said electrolytic cell into first and second sections;

a cathode arranged in said first section;

an anode arranged in said second section;

a power source connected to said cathode and said anode;

a water supply pipe connected to said electrolytic cell for inputting water to said electrolytic cell;

a first delivery pipe connected to said first section for outputting cathodic water from said first section;

a second delivery pipe connected to said second section for outputting anodic water from said second section; and means for supplying an aqueous solution containing chitin chitosan to a member from the group consisting of: said cathodic water, said anodic water, and both of said anodic water and said cathodic water.

11. The apparatus of claim 10, wherein said means for supplying comprises:

a first pipe connected to said first delivery pipe for inputting said aqueous solution containing chitin chitosan to said cathodic water;

a second pipe connected to said second delivery pipe for inputting said aqueous solution containing chitin chitosan to said anodic water;

means for storing said aqueous solution containing chitin chitosan; and a valve interconnecting said first pipe, said second pipe and said means for storing, for selectively delivering said aqueous solution containing chitin chitosan to a member from the group consisting of: said first pipe, said second pipe, and both of said first pipe and said second pipe.

12. The apparatus of claim 11, wherein said means for storing comprises a storage tank.

13. The apparatus of claim 11, wherein said means for supplying further comprises a pump for pumping said aqueous solution from said means for storing to said first and second delivery pipes.

14. The apparatus of claim 13, further comprising:

at least one flow rate sensor mounted on at least one of said pipes; and a control unit connected to said power source, said valve, said pump, and said at least one flow rate sensor.

15. The apparatus of claim 10, wherein said water supply pipe comprises first and second branch pipes, wherein said first branch pipe is connected to said first section and said second branch pipe is connected to said second section.

16. The apparatus of claim 10, further comprising:

at least one flow rate sensor mounted on at least one of said pipes; and a control unit connected to said power source, said means for supplying and said at least one flow rate sensor.

17. The apparatus of claim 16, wherein said at least one flow rate sensor comprises:

a first flow rate sensor mounted on said first delivery pipe; and a second flow rate sensor mounted on said second delivery pipe.

18. The apparatus of claim 17, further comprising:

an operation panel connected to said control unit, wherein operation of said operation panel controls said control unit to turn said power source on or off, and to control a quantity of said aqueous solution to be supplied by said means for supplying.

19. The apparatus of claim 16, wherein said at least one flow rate sensor comprises:

a first flow rate sensor mounted on one of said first delivery pipe said second delivery pipe; and a second flow rate sensor mounted on said water supply pipe.

20. The apparatus of claim 10, wherein said electrolytic cell is a flowing type electrolysis processor.

21. The apparatus of claim 10, wherein said electrolytic cell is a pool type electrolysis processor.

\* \* \* \* \*